United States Patent
Spillman et al.

[19]

[11] Patent Number: 6,165,638
[45] Date of Patent: *Dec. 26, 2000

[54] ELECTROCHEMICAL CELL HAVING MULTIPLATE AND JELLYROLL ELECTRODES WITH DIFFERING DISCHARGE RATE REGIONS

[75] Inventors: David M. Spillman, Tonawanda; Esther S. Takeuchi, East Amherst, both of N.Y.

[73] Assignee: Wilson Greatbatch Ltd., Clarence, N.Y.

[ * ] Notice: This patent is subject to a terminal disclaimer.

[21] Appl. No.: 09/295,090

[22] Filed: Apr. 20, 1999

Related U.S. Application Data

[63] Continuation-in-part of application No. 08/832,909, Apr. 4, 1997, Pat. No. 5,935,728.

[51] Int. Cl.$^7$ ...................................................... H01M 4/04
[52] U.S. Cl. .................................................. 429/94; 429/9
[58] Field of Search ................... 429/94, 9, 149

[56] References Cited

U.S. PATENT DOCUMENTS

| | | | |
|---|---|---|---|
| 1,024,577 | 4/1912 | Hite . | |
| 3,861,397 | 1/1975 | Rao et al. | 128/419 |
| 3,982,966 | 9/1976 | Beatty et al. | 429/136 |
| 4,031,899 | 6/1977 | Benirie | 128/419 |
| 4,447,504 | 5/1984 | Goebel | 429/9 |
| 4,830,940 | 5/1989 | Keister et al. | 429/194 |
| 4,879,190 | 11/1989 | Lundsgnard | 429/94 |
| 5,164,273 | 11/1992 | Szasz et al. | 429/123 |
| 5,169,732 | 12/1992 | Beldock et al. | 429/150 |
| 5,183,712 | 2/1993 | Beldock et al. | 429/9 |
| 5,435,874 | 7/1995 | Takeuchi et al. | 156/242 |
| 5,458,997 | 10/1995 | Crespi | 429/219 |
| 5,534,369 | 7/1996 | Nagaura | 429/161 |
| 5,614,331 | 3/1997 | Takeuchi et al. | 429/9 |
| 5,935,724 | 8/1999 | Spillman et al. | 429/9 |
| 5,935,728 | 8/1999 | Spillman et al. | 429/94 |

FOREIGN PATENT DOCUMENTS 254852  7/1926  United Kingdom .

*Primary Examiner*—Carol Chaney
*Attorney, Agent, or Firm*—Hodgson Russ Andrews Woods & Goodyear LLP

[57] ABSTRACT

An electrochemical cell comprising a medium rate electrode region intended to be discharged under a substantially constant drain and a high rate electrode region disposed in a jellyroll wound configuration intended to be pulse discharged, is described. Both electrode regions share a common anode and are activated with the same electrolyte.

21 Claims, 2 Drawing Sheets

ELECTROCHEMICAL CELL HAVING MULTIPLATE AND JELLYROLL ELECTRODES WITH DIFFERING DISCHARGE RATE REGIONS

CROSS-REFERENCE TO RELATED APPLICATION

The present application is a continuation-in-part of U.S. patent application Ser. No. 08/832,909, filed Apr. 4, 1997, now U.S. Pat. No. 5,935,728.

BACKGROUND OF THE INVENTION

1. Field of the Invention

The present invention generally relates to the conversion of chemical energy to electrical energy. More particularly, the present invention relates to an electrochemical cell dischargeable under both a constant discharge rate and a pulse discharge rate. Cardiac defibrillators present both electrical power requirements.

The constant discharge rate portion of the present multiplate cell of the present invention, referred to hereinafter as the medium rate region, preferably includes a high mass, low surface area cathode structure associated with an alkali metal anode in a side-by-side, prismatic configuration. The pulse discharge rate portion of the multiplate cell of the present invention, referred to hereinafter as the high rate region, preferably includes a high surface area cathode associated with an alkali metal anode in a jellyroll wound configuration. Preferably the same anode structure is electrically associated with both the medium rate cathode region and the high rate cathode region housed within the same hermetically sealed casing. This structure defines what is meant by a medium rate region and a high rate region contained within the same electrochemical cell.

2. Prior Art

Traditionally, cardiac defibrillator cells have been built using a multiplate electrode design. The cell designer must decide between providing additional electrochemically active components for increased mass and energy density or providing increased surface area for greater power density. Because of the wide disparity in the energy/power requirements placed upon a cardiac defibrillator cell or battery, that being intermittent low rate and high rate operation, a compromise is often decided upon. However, any design attempt to balance the energy/power requirements placed upon the cell or battery by the defibrillator device must not consequently produce unwanted self-discharge reactions. This compromise can provide for inefficiency and can decrease the overall gravimetric and volumetric energy density of the cell.

It is generally accepted that when low electrical currents are desired, the electrodes within a cell should have as much mass and as little surface area as possible. At the expense of power density, this provides for increased energy density while the low electrode surface area minimizes undesirable self-discharge reactions. Conversely, when larger electrical discharge currents are required, electrode surface area and power density are maximized at the expense of energy density and self-discharge rate.

The cell of the present invention having an electrode assembly with differing discharge rate portions fulfills this need. The present cell comprises regions containing a low interelectrode surface area in a side-by-side, prismatic configuration, preferred for routine monitoring by a device, for example a cardiac defibrillator, and regions containing a high interelectrode surface area in a jellyroll wound configuration for use when high rate electrical pulse charging of capacitors is required with minimal polarization. It is believed that the present electrochemical cell having multiplate electrodes with differing discharge rate regions represents a pioneering advancement wherein a medium discharge rate region and a high discharge rate region are provided within the same cell for the purpose of having the cell supply at least two different electrical energy requirements.

SUMMARY OF THE INVENTION

The present invention provides an improved multiplate and jellyroll electrode design for a cell dischargeable to provide both background current intermittently interrupted by current pulse discharge. The disclosed cell is of a case-negative design in which the anode assembly is in electrical contact with the case. Two positive terminal pins are respectively connected to two independent cathode regions. One cathode region has a relatively low surface area and high density for providing low electrical current on the order of microamperes to milliamperes and the other cathode region has a relatively high surface area for providing high electrical current on the order of several amperes.

The medium rate, constant discharge region of the present multiplate cell comprises a cathode structure of one or more cathode plates flanked on either side by an alkali metal anode. The cathode material, which preferably comprises a mixed metal oxide or a carbon/graphite intercalation compound, suitable conductive additive(s) and a binder, may be in a dry powder form and is pressed onto a conductive metal screen. The alkali metal anode is preferably a piece of lithium or lithium-alloy foil that is also pressed onto a conductive metal screen. A metallic lead connects the medium rate cathode region to a feedthrough terminal pin in the battery header which is insulated from the battery case by a glass-to-metal seal. The anode can either be connected to the case resulting in a case-negative configuration or to another feedthrough pin also located in the header of the battery. A separator prevents short circuiting between the couple.

The high rate, pulse discharge region of the present multiplate cell comprises a cathode structure of one or more cathode sheets associated in a jellyroll wound configuration with the same anode that is coupled to the medium rate region. The interelectrode surface area of the high rate region is greater than that of the medium rate region to deliver high current during device activation. Preferably the medium rate region contributes greater than 10% of the total energy density provided by the cathode electrode while having less than 50% of the total cathode surface area. Still, more preferably, the medium rate region contributes greater than 10% of the total energy density provided by the cathode electrode while having less than 30% of the total cathode surface area.

Thus, the present invention offers the advantage of having both a medium rate, constant discharge or constant drain region and a high rate, pulse discharge region provided within the same electrochemical cell. The electrochemical couple used for both the medium rate region and the high rate region is, for example, an alkali metal/mixed metal oxide couple such as a lithium-silver vanadium oxide couple. However, both discharge region couples need not necessarily be identical. Multiplate electrode electrochemical cells according to the present invention having medium rate and high rate discharge regions can be constructed/ designed to meet the drain rate and current discharge requirements of a particular application.

These and other aspects of the present invention will become more apparent to those skilled in the art by reference to the following description and the appended drawings.

DETAILED DESCRIPTION OF THE PREFERRED EMBODIMENTS

Figure 1:
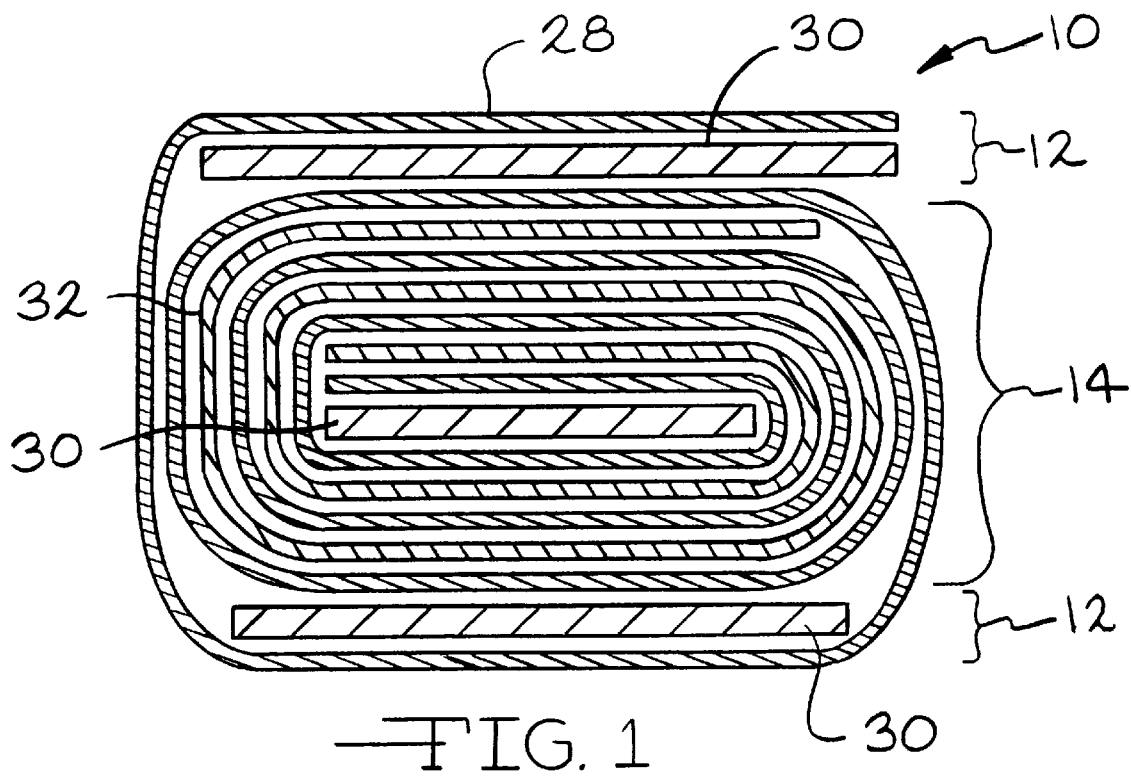
FIG. 1 is a diagrammatic view of an electrochemical cell 10 with multiplate and jellyroll electrodes according to the present invention.
Figure 2:
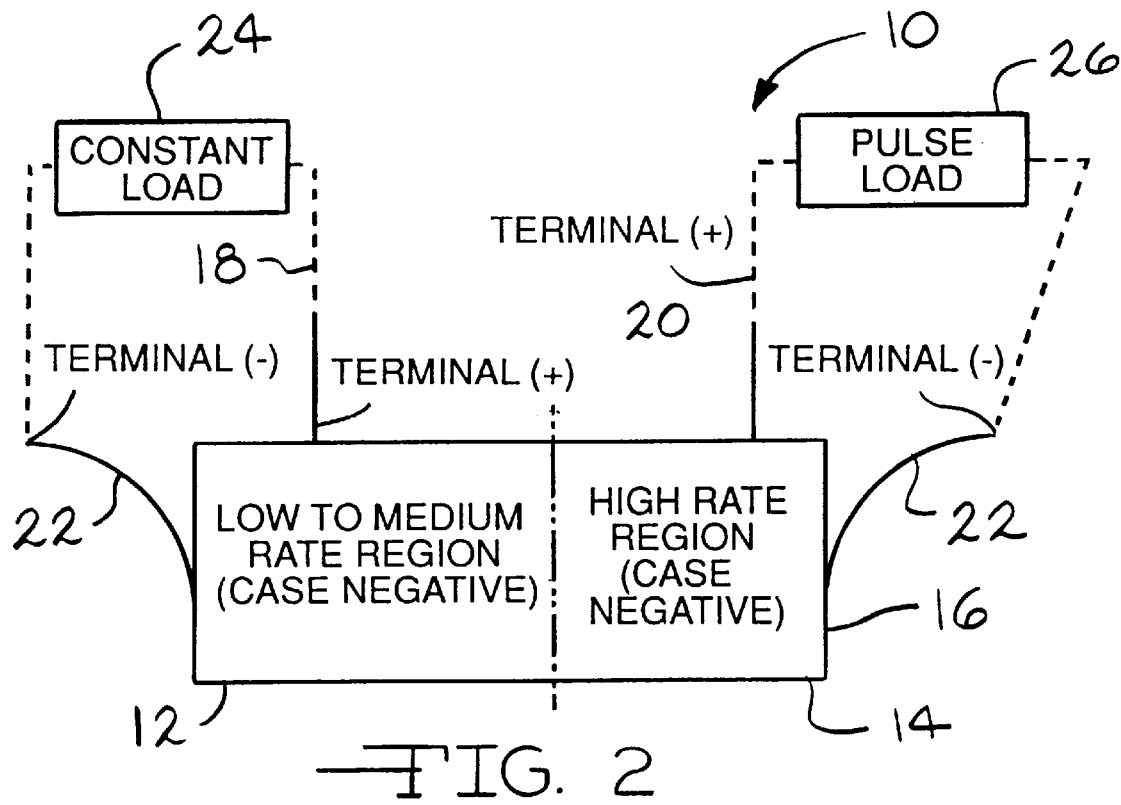
FIG. 2 is a schematic of the electrochemical cell shown in FIG. 1.

Referring now to the drawings, FIGS. 1 and 2 show an electrochemical cell 10 with multiplate and jellyroll electrodes constructed according to the present invention having both a medium rate region 12 and a high rate region 14 hermetically sealed within a metallic, prismatic casing 16. The medium rate region 12 preferably provides a relatively constant discharge current and, the high rate region 14 preferably provides a current pulse discharge power source. Both electrode regions are activated with the same electrolyte solution.

As diagrammatically shown in FIG. 2, the present multiplate electrode cell comprises two positive terminal leads 18, 20 and a common negative terminal lead 22. In other words, the medium rate region and the high rate region have separate and distinct positive terminals and the same negative terminal, i.e., the prismatic casing 16. Two different loads are applied to this battery. A constant resistance load 24 is connected to the positive terminal 18 and the negative terminal 20, i.e., the casing 16, and a constant current pulse "load" 26 is connected to the positive terminal 20 and the casing 16. The housing 16 is vacuum filled with a nonaqueous electrolyte common to both the medium rate region 12 and the high rate region 14. A device providing both a constant resistance load and a constant current pulse "load" is, for example, an implantable medical device such as a cardiac defibrillator.

More particularly, the anode electrode for the medium rate region and the high rate region of an electrochemical cell with multiplate electrodes according to the present invention is selected from Group IA of the Periodic Table of Elements, including lithium, sodium, potassium, calcium, magnesium or their alloys, or any alkali metal or alkali-earth metal capable of functioning as an anode. Alloys and intermetallic compounds include, for example, Li—Si, Li—B and Li—Si—B alloys and intermetallic compounds. The preferred anode comprises lithium, and the more preferred anode comprises a lithium alloy, the preferred lithium alloy being lithium-aluminum with the aluminum comprising from between about 0% to about 50%, by weight, of the alloy.

As shown in FIG. 1, the anode for the medium rate region 12 and the high rate region 14 is a thin metal sheet or foil 28 of the anode metal, pressed or rolled on a metallic anode current collector, i.e., preferably comprising nickel. The anode has an extended tab or lead of the same material as the anode current collector, i.e., preferably nickel, integrally formed therewith, such as by welding. In this configuration, the lead is contacted by a weld to the conductive metal casing 16 serving as the negative terminal 20 in a case-negative configuration for both regions 12, 14. The casing 16 is preferably a prismatic housing that may comprise materials such as stainless steel, mild steel, nickel-plated mild steel, titanium or aluminum, but not limited thereto, so long as the metallic material is compatible for use with the other components of the cell.

The cathode active material for both the medium rate and high rate regions may comprise a metal element, a metal oxide, a mixed metal oxide, a metal sulfide or carbonaceous compounds, and combinations thereof. Suitable cathode active materials include silver vanadium oxide (SVO), copper vanadium oxide, copper silver vanadium oxide (CSVO), manganese dioxide, titanium disulfide, copper oxide, copper sulfide, iron sulfide, iron disulfide, lithiated cobalt oxide, lithiated nickel oxide, carbon and fluorinated carbon, and mixtures thereof.

Preferably, the cathode active material comprises a mixed metal oxide formed by a chemical addition reaction, thermal decomposition reaction, hydrothermal synthesis, sol-gel formation, chemical vapor deposition, ultrasonically generated aerosol deposition, or by a thermal spray coating process of various metal sulfides, metal oxides or metal oxide/elemental metal combinations. The materials thereby produced contain metals and oxides of Groups IB, IIB, IIIB, IVB, VB, VIB, VIIB and VIII of the Periodic Table of Elements, which includes the noble metals and/or their oxide compounds.

By way of illustration, and in no way intended to be limiting, an exemplary cathode active material comprises silver vanadium oxide having the general formula $Ag_xV_2O_y$ in any one of its many phases, i.e., β-phase silver vanadium oxide having in the general formula x=0.35 and y=5.18, γ-phase silver vanadium oxide having in the general formula x=0.74 and y=5.37 and ε-phase silver vanadium oxide having in the general formula x=1.0 and y=5.5, and combination and mixtures of phases thereof.

In the case of the cathode structure for the medium rate region 12, the cathode active material may be in a dry powder form and is pressed onto a conductive metal screen. Suitable materials for the cathode current collector include aluminum and titanium, preferably titanium. Preferably, prior to contact with the conductive current collector, the cathode active material in a finely divided form is mixed with conductive diluents and a binder material and then pressed onto the current collector screen. The binder material is preferably a thermoplastic polymeric binder material. The term thermoplastic polymeric binder material is used in its broad sense and any polymeric material which is inert in the cell and which passes through a thermoplastic state, whether or not it finally sets or cures, is included within the term "thermoplastic polymer". Representative materials include polyethylene, polypropylene and fluoropolymers such as fluorinated ethylene and fluorinated propylene, polyvinylidene fluoride (PVDF) and polytetrafluoroethylene (PTFE), the latter material being most preferred. Natural rubbers are also useful as the binder material with the present invention.

Suitable discharge promoter diluents include graphite powder, acetylene black powder and carbon black powder. Metallic powders such as nickel, aluminum, titanium and stainless steel in powder form are also useful as conductive diluents. In practice, about 80% to about 98%, by weight, of the cathode active material is mixed with about 1% to about 5% of the conductive diluents and, about 1% to about 5% of the binder material. In some cases, no binder material or electronic conductor material is required to provide a similarly suitable cathode body. The cathode structure for the medium rate region may also be prepared by rolling, spreading or pressing a mixture of the materials mentioned above onto a suitable current collector.

The cathode structure for the medium rate region 12, prepared as described above, is preferably in the form of one or more cathode plates 30 operatively associated with the previously described anode sheet 28. The cathode plates 30 have a relatively low surface area and high density for providing low electrical current on the order of about 1 microampere to about 100 milliamperes corresponding to a C-rate of about C/2,300,000 to about C/23. Preferably, at least one cathode plate 30 having a thickness of about 0.004 inches to about 0.040 inches is flanked on either side by oppositely positioned surfaces of the anode 28 prepared as described above.

The high rate region 14 of the present cell comprises a cathode sheet 32 formed from a paste of cathode active material, including binder and conductive additives, calendared into a free-standing structure that is subsequently dried and cut to shape. The shaped cathode structure having a relatively high surface area and a thickness of about 0.001 inches to about 0.025 inches is then pressed onto at least one side and preferably both sides of a current collector screen of a suitable material, such as aluminum or titanium with titanium being preferred, to provide the cathode structure in the form of the sheet 32. Preferably, the cathode sheet 32 is associated with the anode sheet 28 in a jellyroll wound configuration to provide electrical current on the order of about 1 amp to about 4 amps corresponding to a C-rate of about C/2.3 to about C/0.575. A process for making cathode structures useful in the high rate region of the present multiplate electrode cell is described in U.S. Pat. No. 5,435,874 to Takeuchi et al., which is assigned to the assignee of the present invention and incorporated herein by reference. An alternate preparation technique is to cast a slurry of the cathode active material onto a surface-treated metal foil followed by drying and calendaring.

A preferred configuration for the present multiplate and jellyroll cell 10 is shown in FIG. 1 and comprises a cathode plate 30 of a relatively low surface area and high density inserted into the center of a winding mandrel (not shown) suitable for fabricating flattened jellyroll electrode cells. Possibly, the center cathode plate 30 may serve as a winding mandrel for the jellyroll electrode assembly itself. A jellyroll assembly consisting of the anode sheet 28 and high surface area cathode sheet 32 is then wrapped around the winding mandrel containing the inserted cathode plate 30. That way, the anode sheet 28 is exposed to both surfaces of the central cathode plate 30 and the cathode sheet 32 within the same jellyroll structure. Preferably, additional cathode plates 30 are positioned on one or both of the outer portions of the jellyroll wind.

The lead 18 for the cathode plates 30 of the medium rate region 12 and the lead 20 for the cathode sheet 32 of the high rate region 14 are insulated from the casing 16 by respective glass-to-metal seal/terminal lead feedthroughs. The glass used is of a corrosion resistant type having from between about 0% to about 50% by weight silicon such as CABAL 12, TA 23, CORNING 9013, FUSITE 425 or FUSITE 435. The positive terminal leads 18, 20 preferably comprise molybdenum although titanium, aluminum, nickel alloy, or stainless steel can also be used.

The cathode plate 30, the cathode sheet 32 and the anode sheet 28 for both the medium rate and high rate regions are preferably sealed in their own separator envelopes (not shown for clarity) to prevent direct physical contact between them. The separators are of an electrically insulative material to prevent an internal electrical short circuit between the active materials, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include woven and non-woven fabrics of polyolefinic fibers including polypropylene and polyethylene or fluoropolymeric fibers including polyvinylidine fluoride, polyethylenetetrafluoroethylene, and polyethylenechlorotrifluoroethylene laminated or superposed with a polyolefinic or fluoropolymeric microporous film, non-woven glass, glass fiber materials and, ceramic materials. Suitable microporous films include a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXI-GLAS (C. H. Dexter, Div., Dexter Corp.).

The multiplate and jellyroll electrochemical cell of the present invention further includes a nonaqueous, ionically conductive electrolyte which serves as a medium for migration of ions between the anode and the cathode structures during the electrochemical reactions of the cell. The electrochemical reaction at both the medium rate and high rate regions involves conversion of ions in atomic or molecular forms which migrate from the anode to the cathode. Thus, nonaqueous electrolytes suitable for the present invention are substantially inert to the anode and cathode materials and, they exhibit those physical properties necessary for ionic transport namely, low viscosity, low surface tension and wettability.

A suitable electrolyte has an inorganic, tonically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate into the cathode active material, and has the general formula $MM'F_6$ wherein M is an alkali metal similar to the alkali metal comprising the anode and M' is an element selected from the group consisting of phosphorous, arsenic and antimony. Examples of salts yielding $M'F_6$ are: hexafluorophosphate ($PF_6$), hexafluoroarsenate ($AsF_6$) and hexafluoroantimonate ($SbF_6$), while tetrafluoroborate ($BF_4$) is exemplary of salts yielding $M'F_4$. Alternatively, the corresponding sodium or potassium salts may be used.

Preferably the electrolyte comprises at least one ion-forming alkali metal salt of hexafluorophosphate, hexafluoroarsenate or hexafluoroantimonate dissolved in a suitable organic solvent wherein the ion-forming alkali metal of the salt is similar to the alkali metal comprising the anode. Thus, in the case of an anode comprising lithium, the alkali metal salt comprises lithium hexafluorophosphate, lithium hexafluoroarsenate or lithium hexafluoroantimonate dissolved in a suitable solvent mixture. Other inorganic salts useful with the present invention include $LiBF_4$, $LiClO_4$, $Li_2O$, $LiAlCl_4$, $LiGaCl_4$, $LiC(SO_2CF_3)_3$, $LiN(SO_2CF_3)_2$ and $LiCF_3SO_3$, and mixtures thereof.

Low viscosity solvents include tetrahydrofuran (THF), methyl acetate (MA), diglyme, triglyme, tetraglyme, dimethyl carbonate (DMC), ethyl methyl carbonate (EMC) diethyl carbonate and 1,2-dimethoxyethane (DME), and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolacetone (GBL) and N-methylpyrrolidinone (NMP), and mixtures thereof. In the present invention, the anode is lithium metal and the preferred electrolyte is 1.0M to 1.4M $LiAsF_6$ dissolved in an aprotic solvent mixture comprising a 50/50 mixture (by volume) of propylene carbonate (PC) and dimethoxyethane (DME).

The casing header comprises a metallic lid (not shown) having a sufficient number of openings to accommodate the glass-to-metal seal/terminal lead feedthroughs for the cathode plate 30 of the medium rate region 12 and for the cathode sheet 32 of the high rate region 14. An additional opening is provided for electrolyte filling. The casing header comprises elements having compatibility with the other components of the electrochemical cells and is resistant to corrosion. The cell is thereafter filled with the electrolyte solution described hereinabove and hermetically sealed such as by close-welding a stainless steel plug over the fill hole, but not limited thereto.

An exemplary electrochemical cell dischargeable under both a constant discharge rate and a pulse discharge rate according to the present invention may be constructed having a capacity (Qa) of the anode and a capacity (Qc) of the high rate region and of the medium rate region as follows:

1) A first exemplary condition consists of the high rate region and the medium rate region each having a Qa:Qc ratio greater than 0.8:1.0. This provides the cell of the present invention with adequate anode capacity (Qa) associated with both the high rate region and the medium rate region dischargeable through both the first and second voltage plateaus expected in the discharge of a conventional Li/SVO cell. In the present cell, the Qa:Qc capacity ratio for both the medium rate and high rate regions may be as high as 1.1:1.0 or as low as 0.8:1.0 to control cell swelling.

2) A second exemplary condition consists of the high rate region of the cell of the present invention having a significantly lower Qa:Qc that the medium rate region. For example, the Qa:Qc for the high rate region may be as low as 0.4:1.0 while the anode capacity to cathode capacity for the medium rate region is about 1.1:1.0.

The overall cell balance depends on the ratio of capacity for the high rate region to the medium rate region of the cell. Preferably the high rate region is less than 50% of the total cell capacity, while the medium rate region comprises greater than 50% of the total cell capacity. In the case of a 50:50 capacity ratio between the high rate and medium rate regions of the total cell capacity, the respective Qa:Qc ratios are shown in Table 1.

TABLE 1

| High Rate Region (Qa:Qc) | Medium Rate Region (Qa:Qc) | Total Cell Capacity (Qa:Qc) |
|---|---|---|
| 0.4:1.0 | 1.1:1.0 | 0.75:1.0 |

In the case where the capacity ratio of the medium rate region to the high rate region is 0.6:0.4, the respective Qa:Qc rations are shown in Table 2.

TABLE 2

| High Rate Region (Qa:Qc) | Medium Rate Region (Qa:Qc) | Total Cell Capacity (Qa:Qc) |
|---|---|---|
| [0.4:1.0] 40% of total cathode capacity | [1.1:1.0] 60% of total cathode capacity | 0.82:1.0 |

The following examples describe the manner and process of an electrochemical cell having multiplate electrodes according to the present invention, and they set forth the best mode contemplated by the inventors of carrying out the invention, but they are not to be construed as limiting.

EXAMPLE I

Nine lithium/silver vanadium oxide (Li/SVO) defibrillator cells were built. The cathode for each cell comprised a dry mix of SVO combined with a binder material and a conductive diluent pressed into two separate structures. The casing header contained two terminal pins for connection to the respective cathode structures. Specifically, a first cathode sheet was pressed onto an elongated titanium current collector and welded to the first terminal pin. A single cathode plate was welded to the second terminal pin. Prior to welding to the terminal pins, the longer, first cathode sheet was wound with a lithium anode into a flattened jellyroll structure to provide a high rate discharge region. The single, second cathode plate was inserted into the last face of the wound assembly, forming a medium rate electrode region.

Two of the experimental cells were submitted for short circuit testing at 37° C. using a circuit resistance less than or equal to ten milliohms. The two cells exhibited a peak current of 15.0 amps and 12.2 amps, respectively, within one second of application of the short circuit. One cell exhibited a peak temperature of 116.5° C. at 3:06 (minutes:seconds) into the test. The other cell exhibited a peak temperature of 109.0° C. at 4:12 (minutes:seconds) into the test. Both cells exhibited case swelling. Neither cell was observed to leak, vent or rupture.

The remaining seven cells were subjected to burn-in and acceptance pulse testing and then subjected to a modified accelerated discharge data (ADD) test. Based on electrode surface area, the electrical test parameters were modified so that the same current density was applied to the cells during various aspects of the test. For burn-in and acceptance pulse testing, the two terminal pins were electrically connected and the cells were subjected to a burn-in load of 2.49 kohm for 17 hours. Following this, the cells were subjected to a 2.0 amp acceptance pulse test at 37° C. A pulse train sequence of four pulses each of ten seconds duration with fifteen seconds of rest between pulses was used. Following acceptance pulse testing, the external electrical connection between the two terminal pins was removed.

The seven cells were then submitted for continuous discharge and pulse testing. During this test, the terminal pin connected to the single cathode plate of the medium rate discharge region was connected to a 17.4 kohm resistor. This cathode plate continuously supplied a background current for the cell throughout the test. Once every week, a 1.7 amp pulse train of four pulses of ten seconds duration with fifteen seconds of rest between pulses was applied to the other terminal pin connected to the jellyroll, high rate discharge region. All tests were conducted at 37° C.

The background voltage of the continuous discharge and pulse discharge tested cells exhibited the characteristic SVO discharge profile and several voltage plateaus were observed. The individual cells provided thirty-five pulse trains through one of the terminal pins as the background voltage through the other terminal pin declined to approximately 1000 millivolts. Despite the low background voltage, the pulse 4 minimum voltage of the cells remained above 1.7 volts and the pre-pulse OCV of the electrode assembly designated for high rate pulsing remained above 2.60 volts. The discharge profile, voltage response and capacity provided by six of the seven cells was similar. One cell exhibited reduced capacity in comparison to the others.

Figure 3:
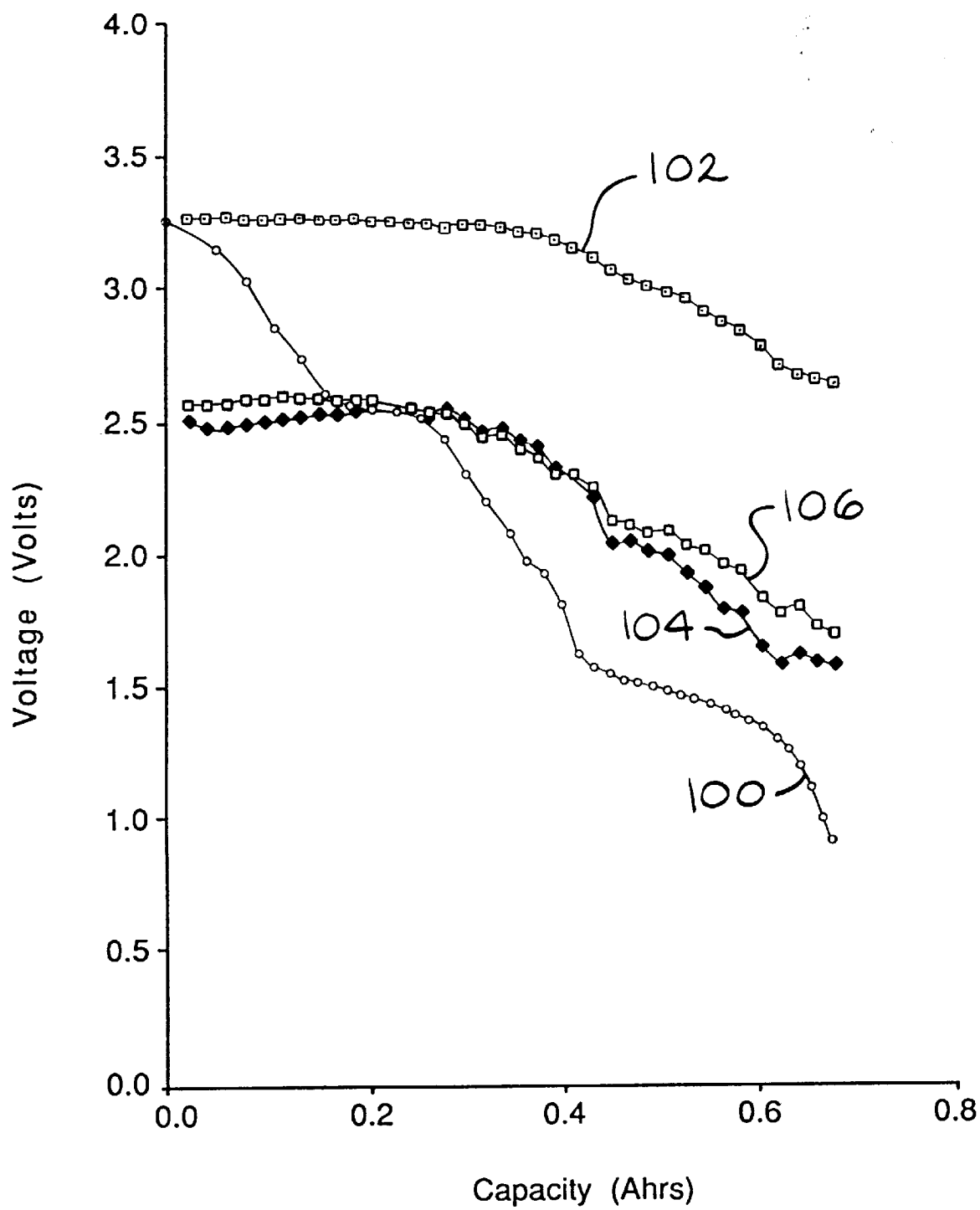
FIG. 3 is a graph constructed from the simultaneous discharge of an electrochemical cell according to the present invention having a medium rate, constant discharge region and a high rate, pulse discharge region.

FIG. 3 is a graph constructed from the simultaneous continuous discharge and pulse discharge of a representative one of the group of seven cells. In particular, curve 100 was constructed from the background current of the medium rate, constant discharge region of the present invention cell and, curve 102 was constructed from the open circuit voltage of the high rate, pulse discharge region, curve 104 was constructed from the pulse 1 minimum voltage and curve 106 was constructed from the pulse 4 minimum voltage of the pulse discharge region.

These results demonstrate that an Li/SVO defibrillator cell can be designed in such a manner so as to provide a higher pulse voltage when the background voltage is low. The design of such a cell is specific to each application and a reasonable compromise must be made among the design variables.

It is appreciated that various modifications to the inventive concepts described herein may be apparent to those skilled in the art without departing from the spirit and scope of the present invention defined by the hereinafter appended claims.

What is claimed is:

1. An electrochemical cell comprising a first electrode comprising a first electrode active material and a second electrode electrically associated with the first electrode to provide a first region having a first effective interelectrode surface area between the first and second electrodes and to provide a second, jellyroll region having a second effective interelectrode surface area between the first and second electrodes, and wherein the first region provides the cell dischargeable at a relatively low electrical current of about 1 microampere to about 100 milliamperes corresponding to a C-rate of about C/2,300,000 to about C/23, and wherein the second region provides the cell dischargeable at a relatively high electrical current of about 1 to about 4 amperes corresponding to a C-rate of about C/2.3 to about C/0.575.

2. The electrochemical cell of claim 1 wherein the first region contributes greater than 10% of the total energy density provided by the second electrode and the first region has less than 50% of the total surface area provided by the second electrode.

3. The electrochemical cell of claim 1 wherein the first electrode is the anode and the second electrode is the cathode.

4. The electrochemical cell of claim 1 wherein the portion of the second electrode providing the first region has greater than 10% of the total energy density provided by the second electrode but less than 30% of the total surface area.

5. The electrochemical cell of claim 1 including a conductive casing serving as a terminal for the first electrode and wherein the first region of the second electrode is connected to a first terminal lead and the second region of the second electrode is connected to a second terminal lead.

6. The electrochemical cell of claim 1 wherein the first region and the second region each contribute about 50% of the total cell capacity and a ratio of the capacity (Qa) of the first electrode to the capacity (Qc) of the second electrode is greater than about 0.75:1.0.

7. The electrochemical cell of claim 1 wherein a capacity ratio of the first region to the second region is about 0.5:0.5.

8. The electrochemical cell of claim 7 wherein a ratio of the capacity of the first electrode to the capacity of the first region of the second electrode is about 1.1:1.0 and a ratio of the capacity of the first electrode to the capacity of the second region of the second electrode is about 0.4:1.0, and wherein a ratio of the total capacity of the first electrode to the total capacity of the second electrode is about 0.75:1.0.

9. The electrochemical cell of claim 1 wherein a capacity ratio of the first region to the second region is about 0.6:0.4.

10. The electrochemical cell of claim 9 wherein a ratio of the capacity of the first electrode to the capacity of the first region of the second electrode is about 1.1:1.0 and a ratio of the capacity of the first electrode to the capacity of the second region of the second electrode is about 0.4:1.0, and wherein a ratio of the total capacity of the first electrode to the total capacity of the second electrode is about 0.82:1.0.

11. The electrochemical cell of claim 1 wherein a capacity ratio of the first region to the second region is about 1.1:1.0 to about 0.8:1.0.

12. The electrochemical cell of claim 1 wherein the first region is provided by at least one structure of a second electrode active material of the second electrode and wherein the second region of the second electrode is provided by at least one structure of a third electrode active material.

13. The electrochemical cell of claim 12 wherein the second and third electrode active materials are the same.

14. The electrochemical cell of claim 12 wherein the second and third electrode active materials are dissimilar.

15. The electrochemical cell of claim 1 wherein the first electrode is associated with the second region of the second electrode in a jellyroll wound configuration and wherein the first electrode is associated with the first region of the second electrode in a face-to-face, prismatic relationship.

16. The electrochemical cell of claim 15 wherein at least one second electrode structure comprising the first region is disposed in a face-to-face, prismatic position centered in the jellyroll wound configuration of the first electrode and the second region of the second electrode and wherein at least one second electrode structure comprising the first region is associated with the first electrode in a face-to-face, prismatic relationship spaced outwardly farther than the second region of the second electrode associated with the first electrode in the jellyroll wound configuration.

17. An electrochemical cell capable of delivering electrical current in a first range of currents and which is independently and simultaneously capable of delivering electrical current in a second range of currents greater than the first range and wherein the second range of electrical current is provided by a portion of the electrodes comprising the cell disposed in a jellyroll configuration.

18. The electrochemical cell of claim 17 wherein the first range of currents is about 1 microampere to about 100 milliamperes corresponding to a C-rate of about C/2,300,000 to about C/23, and wherein the second range of current is about 1 ampere to about 4 amperes corresponding to a C-rate of about C/2.3 to about C/0.575.

19. In combination with an implantable medical device requiring electrical power for a monitoring function and for a device operating function, an electrochemical cell which is capable of providing an electrical current of about 1 microamperes to about 100 milliamperes corresponding to a C-rate of about C/2,300,000 to about C/23 for the monitoring function, and wherein the electrochemical cell is independently and simultaneously capable of delivering electrical pulse currents of about 1 ampere to about 4 amperes corresponding to a C-rate of about C/2.3 to about C/0.575 for the device operating function and wherein the electrical pulse currents for the device operating function are provided by a portion of the electrodes of the electrochemical cell disposed in a jellyroll configuration.

20. In combination with an implantable medical device requiring electrical power for a monitoring function and a device operating function, an electrochemical cell comprising:

a) a medium rate, constant dischargeable or constant drain electrochemical couple for providing low level currents for the monitoring function;

b) a high rate, pulse dischargeable electrochemical couple provided in a jellyroll configuration for providing high level current for the operating function; and c) a single casing means containing both couples wherein the medium rate, constant drain couple and the high rate, pulse dischargeable couple share the same anode.

21. The combination of claim 20 wherein the casing has a prismatic shape.

* * * * *